(12) United States Patent
Trindade et al.

(10) Patent No.: US 7,097,418 B2
(45) Date of Patent: Aug. 29, 2006

(54) DOUBLE IMPINGEMENT VANE PLATFORM COOLING

(75) Inventors: Ricardo Trindade, Conventry, CT (US); Dan Que Pham, Montreal (CA); Larry Lebel, Sherbrooke (CA)

(73) Assignee: Pratt & Whitney Canada Corp., Longueuil (CA)

(*) Notice: Subject to any disclaimer, the term of this patent is extended or adjusted under 35 U.S.C. 154(b) by 105 days.

(21) Appl. No.: 10/870,543

(22) Filed: Jun. 18, 2004

(65) Prior Publication Data

US 2005/0281663 A1    Dec. 22, 2005

(51) Int. Cl.
*F03B 11/02* (2006.01)
(52) U.S. Cl. .................... 415/115; 415/178; 416/96 R; 416/97 R
(58) Field of Classification Search ................ 415/115, 415/116, 114, 117, 173.1, 178, 189; 416/90 R, 416/96 R, 97 R
See application file for complete search history.

(56) References Cited

U.S. PATENT DOCUMENTS

| | | | |
|---|---|---|---|
| 4,157,232 A | 6/1979 | Bobo et al. | |
| 4,348,157 A | 9/1982 | Campbell et al. | |
| 4,497,610 A | 2/1985 | Richardson et al. | |
| 4,573,865 A | 3/1986 | Hsia et al. | |
| 4,721,433 A | 1/1988 | Piendel et al. | |
| 4,821,522 A | 4/1989 | Matthews et al. | |
| 5,169,287 A | 12/1992 | Proctor et al. | |
| 5,398,496 A | 3/1995 | Taylor et al. | |
| 5,417,545 A | 5/1995 | Harrogate | |
| 5,470,198 A | 11/1995 | Harrogate et al. | |
| 5,584,651 A | 12/1996 | Pietraszkiewicz et al. | |
| 5,964,575 A | 10/1999 | Marey | |
| 6,077,035 A | 6/2000 | Walters et al. | |
| 6,082,961 A | 7/2000 | Anderson et al. | |
| 6,139,257 A | 10/2000 | Proctor et al. | |
| 6,231,303 B1 | 5/2001 | Tiemann et al. | |
| 6,612,806 B1 | 9/2003 | Bolms et al. | |
| 6,779,597 B1 * | 8/2004 | DeMarche et al. | ......... 165/169 |

* cited by examiner

*Primary Examiner*—Edward K. Look
*Assistant Examiner*—Dwayne J White
(74) *Attorney, Agent, or Firm*—Ogilvy Renault LLP

(57) ABSTRACT

A gas turbine engine vane assembly provides double impingement cooling of a vane platform. An impingement structure disposed adjacent the vane platform defines at least first and second plenums in fluid flow communication, respectively defined in part by the vane platform. The vane platform has first and second surfaces defined within the first and second plenums, and which are cooled by successive impingement of secondary cooling air flow through the impingement structure.

25 Claims, 3 Drawing Sheets

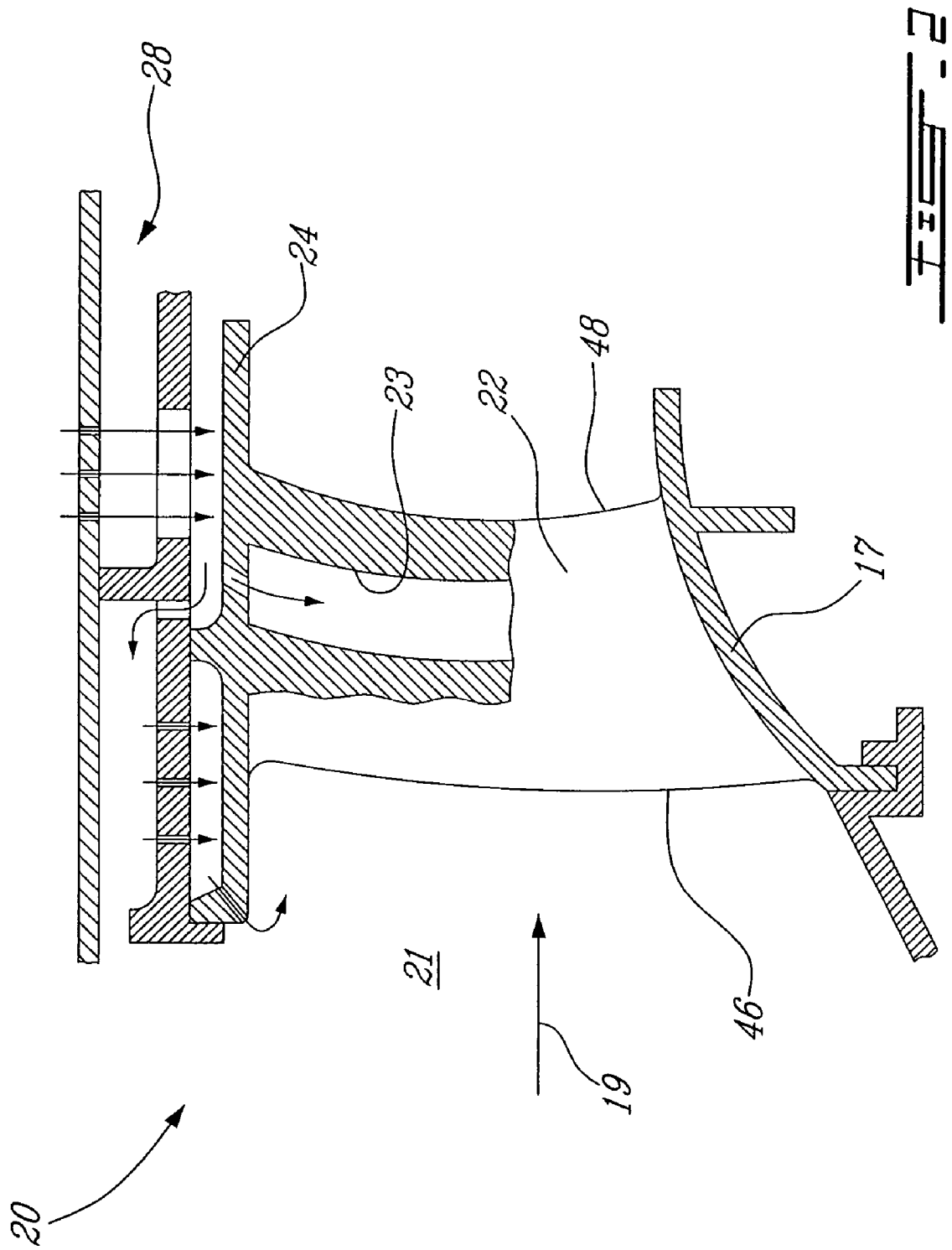

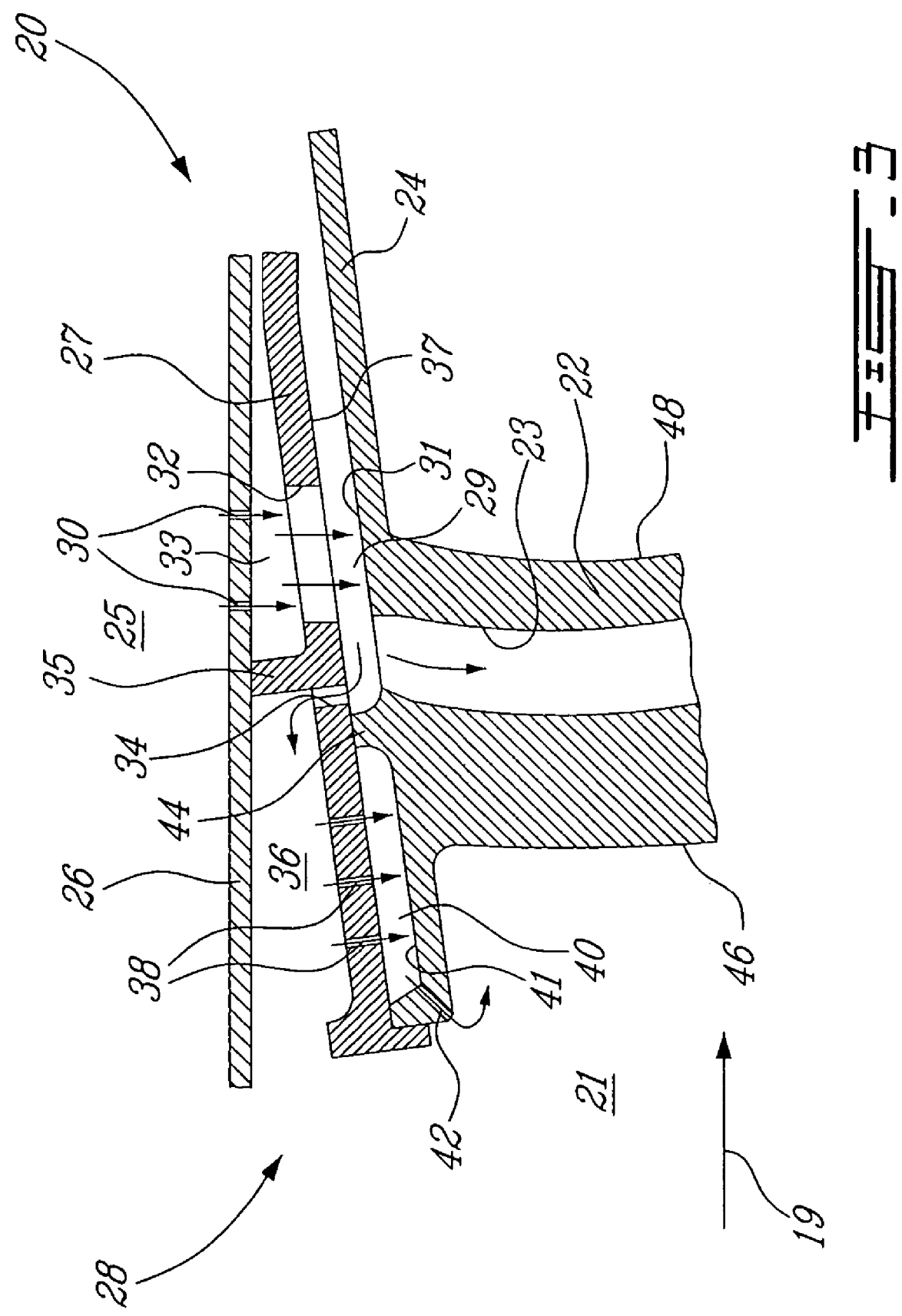

DOUBLE IMPINGEMENT VANE PLATFORM COOLING

TECHNICAL FIELD

The invention relates generally to structure cooling in a gas turbine engine, and more particularly to impingement cooling of a turbine vane platform.

BACKGROUND OF THE ART

Turbine cooling is typically achieved using compressor bleed air. To improve cycle efficiency, it is desirable to reduce the amount of cooling air diverted form the main gas path. One approach is to use multiple-impingement, or re-use of cooling air to achieve additional cooling. For example, U.S. Pat. No. 4,573,865, to Hsia et al. discloses a multiple-impingement cooled turbine shroud having a unitary construction which includes impingement baffles and internal cavities within which a portion of the shroud surface is impinged with cooling air. However, this construction is complex and expensive to manufacture, and not readily adaptable to variations in the impingement cooling characteristics. Improvement is therefore desired.

SUMMARY OF THE INVENTION

It is therefore an object of the present invention to do provide improved impingement cooling of a turbine vane platform.

In one aspect, the present invention provides a gas turbine engine vane assembly comprising: an airfoil extending from a vane platform and adapted to extend through a main gas flow passage of said gas turbine engine; an impingement structure disposed adjacent said vane platform and defining at least first and second plenums therebetween, said first and second plenums being in fluid flow communication and defined in part by said vane platform, said vane platform having first and second surfaces respectively defined within said first and second plenums, said impingement structure having first impingement holes communicating between a source of secondary cooling air and said first plenum for impingement cooling of said first surface, and second impingement holes communicating between said first plenum and said second plenum for impingement cooling of said second surface, said second plenum disposed upstream of said first plenum relative to a primary gas flow direction through said main gas flow passage, said second plenum disposed downstream of said first plenum relative to secondary cooling air flow therethrough; and an exhaust passage communicating between said second plenum and said main gas flow passage for exhausting said secondary cooling air flow into said main gas flow passage.

In a second aspect, the present invention provides a gas turbine engine vane assembly comprising: an airfoil extending from a vane platform; an impingement structure disposed adjacent said vane platform and co-operating therewith to define first and second plenums in serial fluid flow communication, said first and second plenums being axially adjacent one another in a primary gas flow direction and separated form one another by a dividing member radially extending between said outer vane platform and said impingement structure, the impingement structure including first means for communicating between a source of secondary cooling air and said first plenum and for impingement cooling of a portion of said vane platform defining said first plenum, the impingement structure including second means for communicating secondary cooling air between said first plenum and said second plenum and for impingement cooling of a portion of said vane platform defining said second plenum; and means for providing fluid flow communication between said second plenum and said main gas flow passage to exhaust said secondary cooling air into said main gas flow passage.

In a third aspect, the present invention provides a method of cooling a vane assembly in a gas turbine engine, the vane assembly having an airfoil extending from a vane platform and being adapted to extend through a main gas flow passage of the gas turbine engine, the method comprising: impinging secondary cooling air against a first portion of said vane platform adjacent a trailing edge of said airfoil; redirecting at least some of said secondary cooling air upstream relative to a direction of primary gas flow through said main gas flow passage, following said impingement cooling of said first portion; impinging said redirected secondary cooling air against a second portion of said vane platform adjacent a leading edge of said airfoil; and exhausting said secondary cooling air into said main gas flow passage upstream of said airfoil relative to said primary gas flow direction.

Further details of these and other aspects of the present invention will be apparent from the detailed description and Figures included below.

DESCRIPTION OF THE DRAWINGS

Reference is now made to the accompanying Figures depicting aspects of the present invention, in which:

FIG. 2 is a schematic cross-sectional view of a gas turbine engine vane assembly in accordance with the present invention; and FIG. 3 is a schematic cross-sectional view of the vane platform assembly in accordance with the present invention.

DETAILED DESCRIPTION OF PREFERRED EMBODIMENTS

Figure 1:
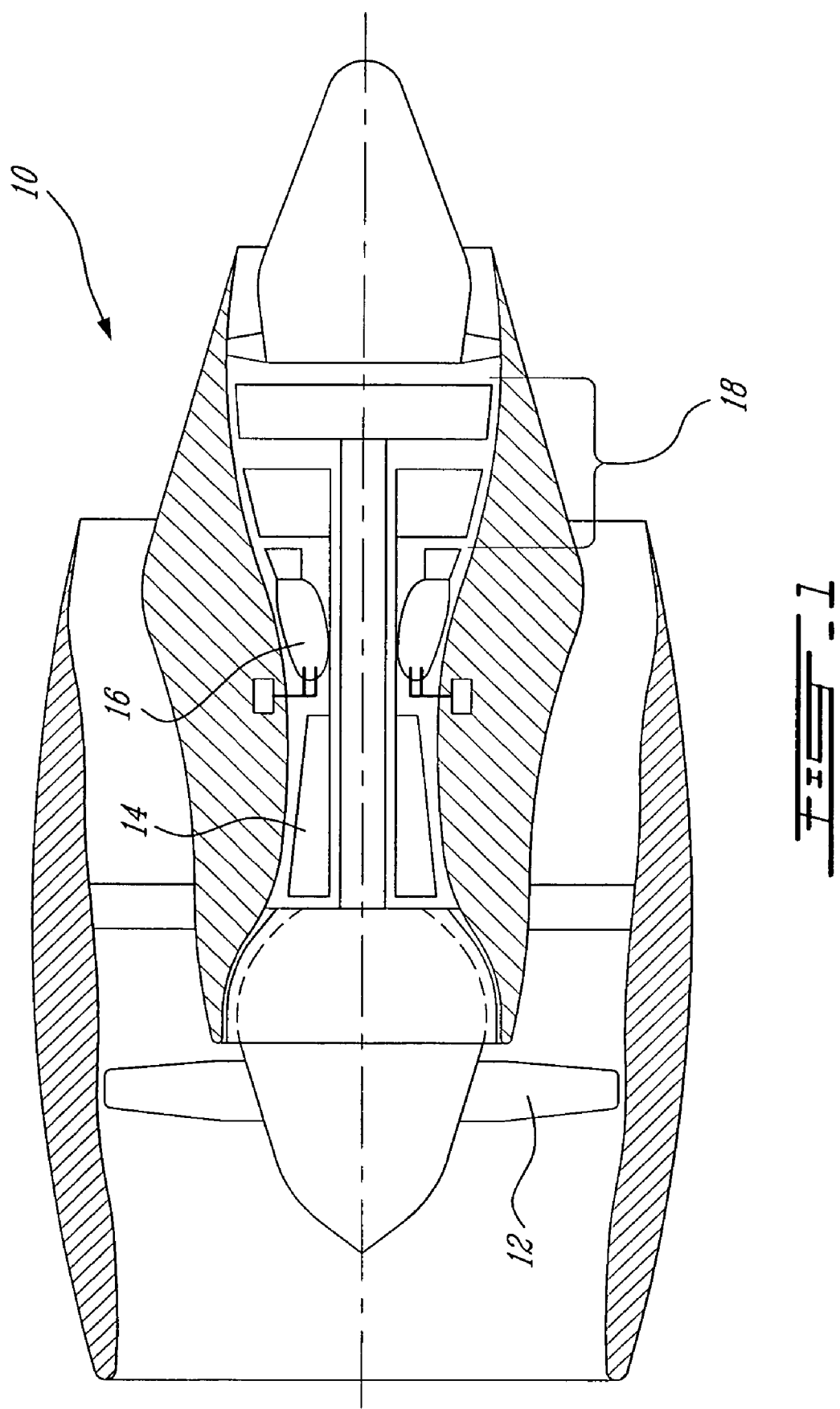
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

In order to derive improved benefit from the secondary cooling air bled from the primary gas flow, the vane assembly 20 of the present invention permits double impingement of the cooling air against a vane outer platform, and employs a structure which is simple and cost efficient to manufacture, and which permits flexibility in design such that the impingement cooling characteristics can be varied.

Referring to FIG. 2, the vane assembly 20 from the turbine section 18 of the gas turbine engine 10 includes an airfoil 22, having leading edge 46 and trailing edge 48, which radially extends through the annular main gas flow passage 21 between inner vane platform 17 and outer vane platform 24. The primary gas flow passes in direction 19 through the gas flow passage 21 exposes the entire vane assembly 20 to extremely high temperatures, thus cooling of the vane assembly is typically desired. This cooling can be achieved, in part, by impingement cooling of the outer vane platform 24 as will be described in greater detail below. In addition to the impingement cooling of the outer vane platform 24, internal cooling passage(s) 23 within airfoil 22 may also provide additional internally cooling of the vane assembly. It is to be understood that the vane assembly 20 may comprise an annular segment including one or more airfoils 22 extending between vane platform segments, wherein a plurality of such annular segments are circumferentially arranged to provide an annular vane ring, or alternately the vane outer and inner platforms 24 and 17 may be continuous annular rings having a plurality of airfoils 22 radially extending therebetween.

Referring now to FIG. 3 showing an outer portion of the vane assembly 20 in greater detail, an annular impingement structure 28 is disposed around the outer vane platform 24 and includes an outer casing 26 and an impingement plate 27 disposed radially between the outer casing 26 and the outer vane platform 24. Particularly, the outer casing 26 is radially outwardly spaced from the impingement plate 27 by at least one spacing portion 35 outwardly protruding from the impingement plate 27, thus defining an outer inlet cavity or plenum 33 and an intermediate plenum 36, disposed upstream from the outer inlet plenum 33 relative to the primary gas flow direction 19 through the main gas passage. The intermediate plenum 36 is in fluid flow communication with both a first impingement plenum 29 and a second impingement plenum 40 which are both adjacent the outer vane platform 24. The outer inlet and intermediate cavities 33 and 36 are axially divided, in the primary gas flow stream-wise direction, by the spacing portion 35 and are therefore not in direct fluid flow communication. Similarly, the impingement plate 27 is radially outwardly spaced from outer surfaces, or end walls, of the outer vane platform 24 by at least a dividing member 44, outwardly protruding from the outer vane platform and abutting the impingement plate 27. Thus, first and second impingement cavities 29 and 40, are defined between the impingement plate 27 and the outer surfaces of the outer vane platform 24. The first impingement plenum 29 defines a fist surface 31 of the vane outer platform 24 therewithin. The second impingement plenum 40 defines a second surface 41 of the vane outer platform 24 therewithin. The first and second surfaces 31 and 41 of the vane outer platform are cooled by impinging cooling air directed there against as described below. The first and second impingement cavities 29 and 40 are axially aligned relative to the primary gas flow direction 19, and do not radially overlap. As such, each of the first and second cavities 29 and 40 radially extend between the outer surfaces 31 and 41 of the outer vane platform, respectively defined within the first and second cavities 29 and 40, and an inner surface 37 of the impingement plate 27. This configuration provides effective double-impingement cooling of the vane outer platform 24, while also providing a simple construction which may be manufactured relatively easily, and therefore less expensively than the prior art such as U.S. Pat. No. 4,573,865, to Hsia et al.

In use, the secondary cooling air is directed to the region 25 surrounding the outer casing 26 of the impingement structure 28. This secondary cooling air is then forced into the impingement structure via a plurality of first impingement holes 30 defined in the outer casing 26. The first impingement holes direct a first set of impinging air jets through an inlet aperture 32 defined in the impingement plate 27 and onto the first surface 31 of the outer vane platform 24 within the first impingement plenum 29. Thus a first impingement cooling pass is provided against a portion of the outer vane platform 24, namely the first surface 31 thereof, which is near to the trailing edge 48 of the airfoil 22. At least some cooling air from the first impingement plenum 29 is then redirected radially outward into the intermediate plenum 36 through a channel 34 defined in the impingement plate 27 upstream (relative to the primary gas from direction 19) from the inlet aperture 32 therein. Some of the secondary cooling air flow from the first impingement plenum 29 can also be redirected, if desired, into at least one internal cooling passage 23 defined within the airfoil 22, if the airfoils are provided with such internal cooling passages.

Air in the intermediate plenum 36 is then forced through a second set of impingement holes 38 defined in the impingement plate 27, upstream of the channel 34, thereby directing a second set of impinging air jets onto the second surface 41 of the outer vane platform 24 within the second impingement plenum 40. Thus, a second impingement cooling pass is provided against the outer vane platform 24, upstream (relative to the primary gas flow direction 19) to the first impingement cooling pass, and therefore near the leading edge 46 of the airfoil 22. Heat from the vane outer platform 24 is accordingly absorbed by the secondary cooling air with each impingement against the surfaces of the outer vane platform. The secondary air is thus becomes heated, and must subsequently be ejected from the vane assembly. Accordingly, following the second impingement cooling pass has occurred, the heated secondary cooling air within the second impingement plenum 40 is exhausted into the main gas flow passage 21 via exhaust passages 42, preferably defined in the upstream end of the outer vane platform 24 such the cooling air is injected into the main gas passage upstream of the airfoils 22.

The vane assembly 20 accordingly provides double impingement cooling of the outer platform 24 as a result of the co-operation of the impingement structure 28, which comprises at least the impingement plate 27 and preferably also the outer casing 26, and the vane outer platform 24. By defining the impingement cavities and their associated impingement holes with these separate and relatively simple-to-manufacture components, the vane assembly is significantly less expensive. Additionally, the simplicity of the modular type arrangement of the vane assembly 20, eliminates the need for nested or overlapping plenum which are complex to manufacture and difficult to modify once designed and produced. In the present invention, substitution of an alternate impingement structure 28 and/or outer vane platform 24 having a different configuration will permit cooling performance to be relatively simply modified.

The above description is meant to be exemplary only, and one skilled in the art will recognize that changes may be made to the embodiments described without departing from the scope of the invention disclosed. For example, although the first set of impingement holes 30 are described as being defined in the outer casing 26, they can alternately be provided in the impingement plate 27, as long as they are in fluid flow communication with the source of secondary cooling air. The arrangement and pattern of impingement holes is within the discretion of the designer, and not considered crucial to this invention. Still other modifications will be apparent to those skilled in the art, in light of a review of this disclosure, and such modifications are intended to fall within the the appended claims.

We claim:

1. A gas turbine engine vane assembly comprising:
   an airfoil extending from a vane platform and adapted to extend through a main gas flow passage of said gas turbine engine;
   an impingement structure disposed adjacent said vane platform and defining at least first and second plenums therebetween, said first and second plenums being in fluid flow communication and defined in part by said vane platform, said vane platform having first and second surfaces respectively defined within said first and second plenums, said impingement structure having first impingement holes communicating between a source of secondary cooling air and said first plenum for impingement cooling of said first surface, and second impingement holes communicating between said first plenum and said second plenum for impingement cooling of said second surface, said second plenum being wholly disposed upstream of said first plenum relative to a primary gas flow direction through said main gas flow passage, said second plenum disposed downstream of said first plenum relative to secondary cooling air flow therethrough; and an exhaust passage communicating between said second plenum and said main gas flow passage for exhausting said secondary cooling air flow into said main gas flow passage.

2. The vane assembly as defined in claim 1, wherein said first and second plenums are axially aligned in said primary gas flow direction.

3. The vane assembly as defined in claim 2, wherein said first and second plenums are axially disposed on opposed sides of a dividing member extending between said vane platform and said impingement structure.

4. The vane assembly as defined in claim 2, wherein said impingement structure includes an impingement plate and a casing disposed radially outward therefrom.

5. The vane assembly as defined in claim 4, wherein at least said second impingement holes are defined in said impingement plate.

6. The vane assembly as defined in claim 4, wherein said first impingement holes are defined in said casing.

7. The vane assembly as defined in claim 1, wherein said first and second plenums communicate via a third plenum.

8. The vane assembly as defined in claim 7, wherein said third plenum is disposed radially outward from said first and second plenums.

9. The vane assembly as defined in claim 8, wherein said impingement structure includes an impingement plate and a casing disposed radially outward therefrom, and said third plenum is defined between said impingement plate and said casing.

10. The vane assembly as defined in claim 1, wherein said airfoil includes an internal cooling passage therein, said internal cooling passage being in fluid flow communication with said first plenum.

11. The vane assembly as defined in claim 1, wherein said exhaust passage exhausts said secondary cooling air into said main gas flow passage upstream of said airfoil.

12. The vane assembly as defined in claim 11, wherein said exhaust passage is defined in said vane platform.

13. A gas turbine engine vane assembly comprising:
an airfoil extending from a vane platform;
an impingement structure disposed adjacent said vane platform and cooperating therewith to define first and second plenums in serial fluid flow communication, said first and second plenums being axially adjacent one another in a primary gas flow direction and separated form one another by a dividing member radially extending between said outer vane platform and said impingement structure, the impingement structure including first means for communicating between a source of secondary cooling air and said first plenum and for impingement cooling of a portion of said vane platform defining said first plenum, the impingement structure including second means for communicating secondary cooling air between said first plenum and said second plenum and for impingement cooling of a portion of said vane platform defining said second plenum; and means for providing fluid flow communication between said second plenum and said main gas flow passage to exhaust said secondary cooling air into said main gas flow passage.

14. The vane assembly as defined in claim 13, wherein said second plenum is disposed upstream of said first plenum relative to said primary gas flow direction, and downstream of said first plenum relative to flow of said secondary cooling air through said impingement structure.

15. The vane assembly as defined in claim 13, wherein said impingement structure includes an impingement plate and an outer casing disposed radially outward therefrom.

16. The vane assembly as defined in claim 15, wherein said first and second plenums radially extend between said vane platform and an inner surface of said impingement plate.

17. The vane assembly as defined in claim 15, wherein said impingement plate abuts said dividing member.

18. The vane assembly as defined in claim 16, wherein at least said second means is defined in said impingement plate.

19. The vane assembly as defined in claim 15, wherein said first means is defined in said outer casing.

20. The vane assembly as defined in claim 13, wherein said exhaust passage exhausts said secondary cooling air into said main gas flow passage upstream of said airfoil.

21. The vane assembly as defined in claim 20, wherein said exhaust passage is defined in said vane outer platform.

22. The vane assembly as defined in claim 16, wherein said first and second plenums communicate via a third plenum.

23. The vane assembly as defined in claim 22, wherein said third plenum is disposed radially outward from said first and second plenums, between said impingement plate and said outer casing.

24. The vane assembly as defined in claim 13, wherein said airfoil includes an internal cooling passage therein, said internal cooling passage being in fluid flow communication with said first plenum.

25. A method of cooling a vane assembly in a gas turbine engine, the vane assembly having an airfoil extending from a vane platform and being adapted to extend through a main gas flow passage of the gas turbine engine, the method comprising:
impinging secondary cooling air against a first portion of said vane platform adjacent a tailing edge of said airfoil;
redirecting at least some of said secondary cooling air upstream relative to a direction of primary gas flow through said main gas flow passage, following said impingement cooling of said first portion;
impinging said redirected secondary cooling air against a second portion of said vane platform adjacent a leading edge of said airfoil; and
exhausting said secondary cooling air into said main gas flow passage upstream of said airfoil relative to said primary gas flow direction.

* * * * *

UNITED STATES PATENT AND TRADEMARK OFFICE
CERTIFICATE OF CORRECTION

PATENT NO. : 7,097,418 B2  Page 1 of 1
APPLICATION NO. : 10/870543
DATED : August 29, 2006
INVENTOR(S) : Ricardo Trindade, Dan Que Pham and Larry Lebel It is certified that error appears in the above-identified patent and that said Letters Patent is hereby corrected as shown below:

claim 25, column 6, line 53, delete "tailing" and insert --trailing--

Signed and Sealed this

Twenty-first Day of November, 2006

JON W. DUDAS
*Director of the United States Patent and Trademark Office*